United States Patent
Caley et al.

[11] 3,779,664
[45] Dec. 18, 1973

[54] DRILL WITH GUIDE TIP

[75] Inventors: Lloyd E. Caley, Seattle; Horace E. Hill, Renton; Joseph L. Phillips, Bellevue, all of Wash.

[73] Assignee: The Boeing Company, Seattle, Wash.

[22] Filed: Dec. 30, 1971

[21] Appl. No.: 214,154

Related U.S. Application Data

[63] Continuation-in-part of Ser. No. 867,204, Oct. 17, 1969, abandoned.

[52] U.S. Cl. .................. 408/225, 408/230, 72/325, 72/464
[51] Int. Cl. ............................................ B23b 51/00
[58] Field of Search .................... 408/223, 225, 230; 72/325, 464

[56] References Cited
UNITED STATES PATENTS

| | | | |
|---|---|---|---|
| 3,592,555 | 7/1971 | Mackey | 408/225 |
| 2,600,286 | 6/1952 | Weiland | 408/211 |
| 3,387,511 | 6/1968 | Ackart et al. | 408/230 |

*Primary Examiner*—Francis S. Husar
*Attorney*—Glenn Orlob et al.

[57] ABSTRACT

A low-cost, conventional twist drill ground with a unique point configuration that includes a symmetrically-shaped, non-cutting, non-threaded, basically conical tip projecting from the center of the drill point with immediately contiguous cutting edges that enable the drill to generate precision holes in non-ferrous metals and other low-yield strength materials including very thick sections.

4 Claims, 11 Drawing Figures

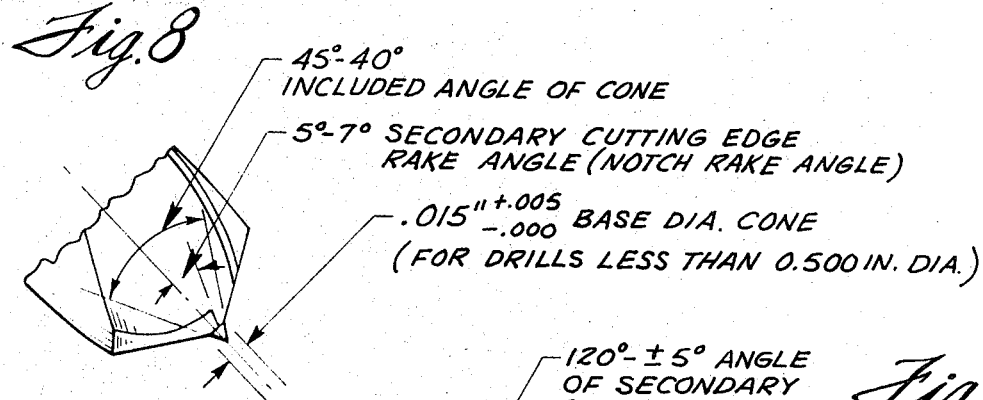
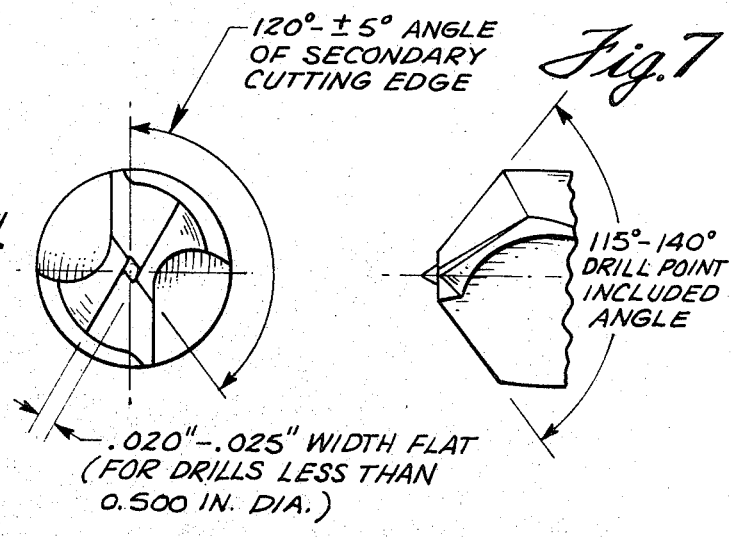
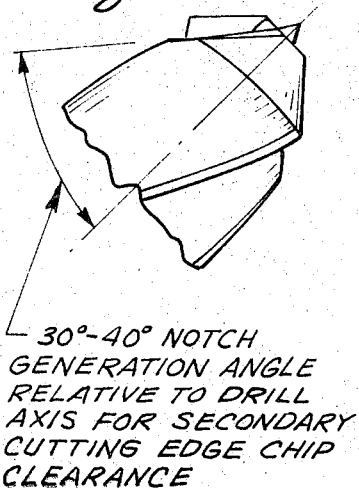
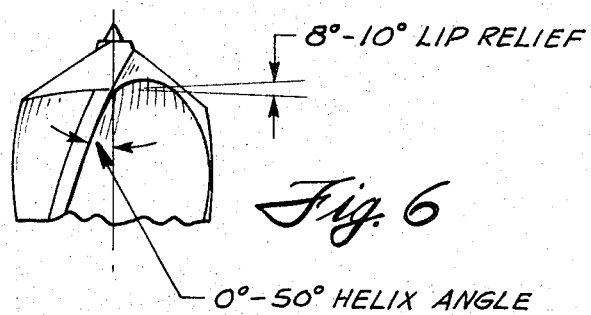

DRILL WITH GUIDE TIP

CROSS REFERENCE TO RELATED APPLICATION

This application is a continuation-in-part of the co-pending application of Lloyd E. Caley, Horace E. Hill and Joseph L. Phillips for DRILL WITH GUIDE TIP, Ser. No. 867,204, filed Oct. 17, 1969 and now abandoned.

BACKGROUND OF THE INVENTION

This invention relates to the art of rotary cutting tools and to a uniquely pointed conventional twist drill for the generation of precision, perfectly straight holes in thick stacks of material. In particular, the inventive feature resides in the unique point grind that includes a small, symmetrically-shaped, non-cutting, non-threaded, basically conical tip and specifically associated cutting edges which allows the use of a conventional, low-cost, twist drill and conventional drilling equipment to produce precision, straight holes without a "corkscrewing" effect common to all other prior art point configurations for this type of drill.

There exists in the art of cutting tools for the primary generation of holes a variety of types of tools such as drills, augers, hole saws, pierces and trepanners. In addition, the drills include a variety of types such as twisted flute drills, straight flute drills, single-margin drills, double margin drills, uncleared margin drills, half-round drills, oil-hole drills, gun-drills, and spade drills. Some of these various types of hole generating tools have been provided with a central tip for locating, piercing or feeding purposes.

The present invention improves the capability of a conventional, low-cost twist drill to the extent that a close-tolerance, good-finish hole that does not deviate from its longitudinal center axis can be produced in a one-shot drilling operation in non-ferrous metals or other low-yield strength materials. In using conventional drills with any other prior art point grind that is usable in metal, the holes produced show a corkscrewed configuration that deviates from the true longitudinal axis from 0.002 to 0.006 inch even though the hole diameter at any cross-sectional plane is almost perfectly round. Thus, if a net fit is desired with a fastener for a uniform load transfer or if a precision, uniform interference fit is desired with a fastener for improved fatigue characteristics, such a conventionally drilled hole must be reamed, broached or bored to obtain the degree of straightness required. With the present invention, the additional steps of reaming, broaching or boring can be eliminated.

The improved drill can be fabricated from any standard type drill by grinding a drill point configuration onto it that consists of a non-cutting, non-threaded, basically conical tip projecting from the point center and with cutting edges immediately contiguous to the conical tip. The conical tip is ground to a small base diameter to minimize drilling thrust. For minimal thrust capacity equipment, this is a diameter smaller than the web of the drill. For drills up to 0.50 inch diameter, the non-cutting tip base diameter is 0.015 to 0.020 inch. When such a non-cutting, stabilizing central tip is ground on the drill with a cone base diameter smaller than the web of the drill, secondary cutting edges must be ground into the web contiguous to the base diameter of the central core. When equipment of high thrust capacity is available, the base diameter of the cone can equal the width of the drill web. When this is the case, the primary cutting edges serve as the contiguous cutting edges.

The tip that protrudes from the center of the drill point serves as an initial locating point and a finite stabilizing feature that continually assures following an absolutely straight line while the drill is generating a hole. The immediately contiguous cutting edges serve to remove extruded metal from the point to allow its continuous, stabilizing penetration. The size of the point, in this respect, is important to allow reasonable thrust and effective metal flow and removal.

When drilling relatively deep holes (over two drill diameters), especially in metal, it is normally necessary to use a conventional twisted-flute drill or an oil-hole type of drill to remove effectively the chips from the hole. Since the oil-hole type is a relatively expensive tool, the conventional twisted-flute drill is commonly used, when possible. This type of tool, however, has a slight, although definite tendency to produce a hole that is "corkscrewed" 0.002 to 0.006 inch from a true, straight axis. An uncleared margin drill would have more support in the hole and would tend to diminish this effect, but the rubbing of its full contact periphery in the hole surface would create problems wiht galling and finish. A survey of the metal cutting industry and the major drill manufacturing industry has disclosed no real knowledge of this corkscrewing phenomena or any projected or known solution since attempts are not normally made to produce precision, straight holes with these types of tools.

SUMMARY

The present invention relates to a twist drill having specific cutting edges immediately adjacent to a symmetrically-shaped, non-cutting, non-threaded tip projecting from the center of the drill point in such a way that this tip can continuously penetrate thick material, including non-ferrous metals, and still provide a stabilizing, guiding action so that a true, perfectly straight hole is obtained. If the central guide tip is not precisely round or if it contains any cutting edges within it, the drill will be insufficiently stabilized to produce a precision hole.

BRIEF DESCRIPTION OF THE DRAWINGS

FIGS. 4 through 8 are various detail views of the preferred novel drill grind showing specific, pertinent dimensions.

DESCRIPTION OF THE INVENTION

As described, any type of drill or rotary cutting implement for generating holes could be provided with the inventive feature. For reasons of practicality, the inventive feature is herein applied solely to twist-type drills with helix angles from 0° to 50°.

A conventional drill is an elongated, cylindrical device with two opposed flutes and cutting edges on the ends of the flutes. The flutes are helical or straight grooves cut into the cylindrical body of the tool to provide clearance for chip removal and to provide a rake angle for generating chips at the tool end. The material remaining between the flutes is the drill web. The cutting end of the drill or "point" is made up of the remaining cylinder less the flutes. Usually in form it resembles a cone, but may depart from a true cone to provide a feeding relief behind the cutting lips. The remaining periphery of the drill body between the flutes is often, although not always, cleared or relieved slightly in such a way that only a small band of material known as a margin is left for guidance. This is done to minimize the area in contact and the probability of galling in the hole.

Figure 1:
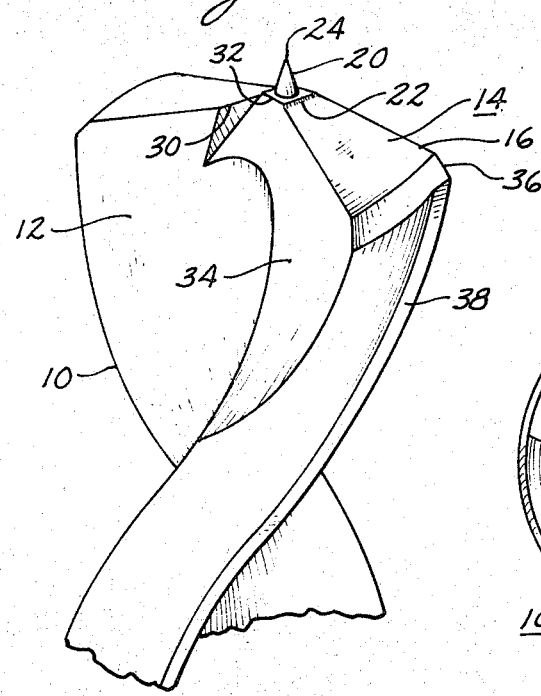
FIG. 1 shows a conventional drill in perspective fashion, its point provided with the preferred novel tip feature.
Figure 3:
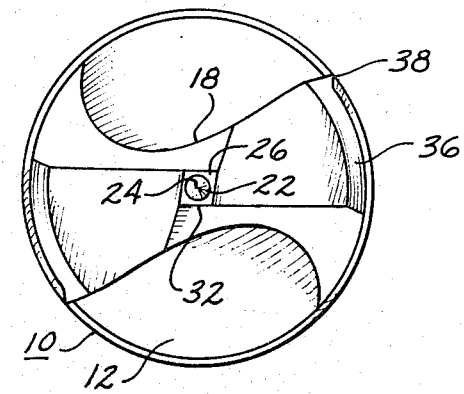
FIG. 3 is a plan view taken along line 3—3 of FIG. 2.
Figure 2:
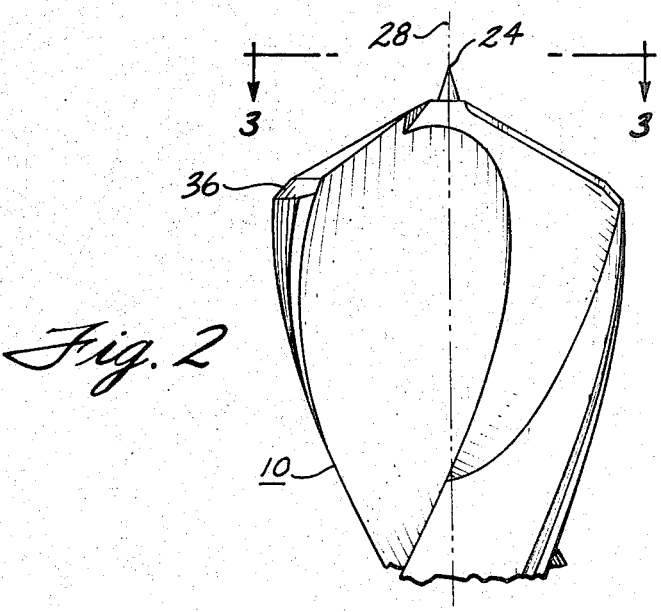
FIG. 2 is a side view of the drill shown in FIG. 1 with axis of rotation or centerline.

FIGS. 1 through 3 represent a particular embodiment of the novel point grind which minimizes drilling thrust force for this invention. An end portion of a drill 10 is illustrated in FIG. 3 of the drawings. The drill 10 is provided with two helical flutes 12 separated by a web 18. It also shows margins 38. The point grind includes the primary cutting edge 16, the primary lip relief 14, the center guide tip 20, the secondary cutting edge 30 and the chip clearance face 34 for the secondary cutting edge 30.

In general, the center guide tip 20 is a cone with its vertex 24 precisely on the axis of rotation 28 of the drill. The sides of the cone 20 from its base diameter 22 to its vertex 24 are usually straight line elements as ground although these elements can wear to either convex or concave elements without degrading the performance of the drill insofar as the vertex 24 does not deviate from the centerline 28 and any cross-section of the cone 20 does not deviate from a true circle whose center is on the centerline 28. To achieve the designated performance from this novel drill grind, the guide tip 20 must be round to within less than 0.001 inch and preferably to within 0.0005 inch with a surface finish of 16 RHR or less. In addition, the guide tip 20 must not have any cutting action whatsoever if it is to provide its stabilizing function. In use, this novel drill grind must be fed into the workpiece at a feedrate of 0.003 inch per revolution or greater if the stabilizing feature is to be successful for precision results.

As shown in the particular embodiment of FIGS. 1 through 3, the base diameter 22 of the cone 20 is smaller than the thickness of the web 18. The recommended base diameter 22 for this low thrust embodiment is 0.015 to 0.020 inch for drills less than 0.50 inch diameter. Since grinding of this small diameter cone will generate high thrust flats 26 on the ends of the drill, secondary cutting edges 30 that are basically contiguous to the base 22 of the cone 20 must be ground to remove as much of the flats 26 as possible and to provide cutting edges 30 that will remove extruded material from the cone 20 as it is drilling. The latter is necessary to allow continuous penetration. The chip clearance surface 34 is generated at the same time the secondary cutting edge 30 is generated at an angle that will not damage the cone 20 and in such a way that the intersection 32 of the surface 34 and the flats 26 is immediately contiguous to the base diameter 22 of the cone 20.

FIGS. 1 through 3 also include blended or slightly radiused corners 36 on the drill point to enhance its ability to produce a good finish in a drilled hole. This is an optional alternative for purposes of hole finish that is not necessary to provide the accuracy claimed for this invention.

It should be noted that the base diameter 22 for the stabilizing tip may vary from that shown herein, especially with larger drill diameters. That shown herein was selected as an optimum diameter for the drills most commonly used in the aircraft industry (below 0.50 inch diameter).

FIGS. 4 through 8 depict specific angles and dimensions for the low-thrust embodiment of this novel point grind. The following criteria apply:

1. Center point must be round within less than 0.001 inch and preferably 0.0005 inch with a 16 RMS or better finish.
2. Drill may be hand split provided center point is not nicked or deformed in the operation.
3. Drill must be split beyond center to produce the secondary cutting edge rake so as to remove the flatted area created by grinding the non-cutting center point.
4. Drill hardness must be a minimum of 62 Rockwell C.
5. Drill must be used at a minimum of 0.003 inch per revolution feed rate.
6. A cutting fluid or lubricant that will prevent material build-up on the drill such as cetyl alcohol or Freon TB-1 (U. S. Pat. No. 3,129,182) should be used.

Figure 9:
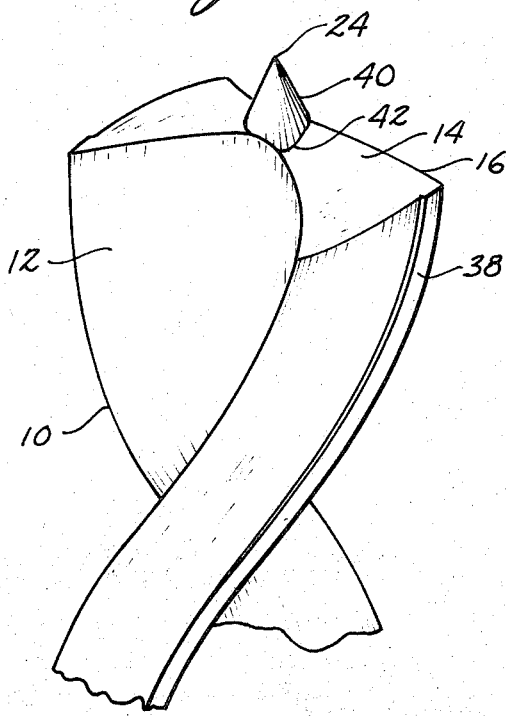
FIG. 9 shows a conventional drill in perspective fashion with a modified version of the novel drill grind for use in high-thrust capacity equipment.
Figure 11:
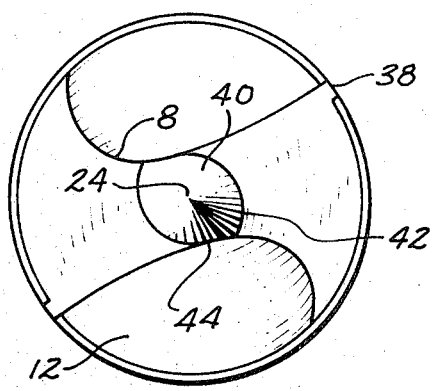
FIG. 11 is a plan view taken along line 11—11 of FIG. 10.
Figure 10:
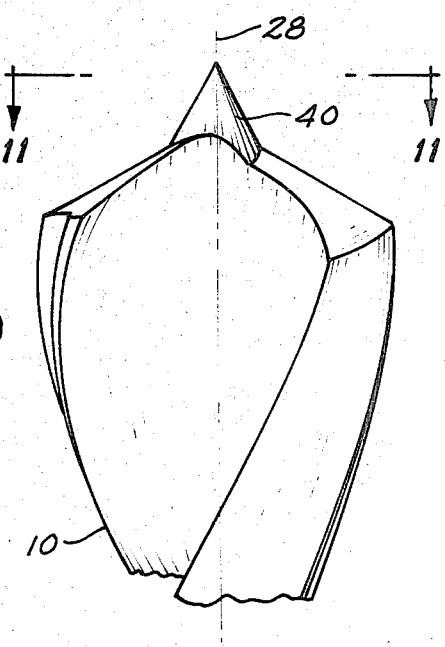
FIG. 10 is a side view of the drill shown in FIG. 9 with axis of rotation or centerline.

FIGS. 9 through 11 show a variation of the point grind on a drill 10. This variation can be used in power feed equipment where high thrust capacity and rigidity is available. Where it can be used, it provides an advantage over the low-thrust version in grinding simplicity. That is, with proper set-up, this point can be ground in one operation versus three for the other. In addition, it requires only a small amount of metal removal per grind versus a large amount for the other. In this particular embodiment the cone or tip 40 is ground such that one of its cross sectional diameters intersects the surface of the flute 12 at the minimum thickness 44 of the web 8.

As shown in the plan view (FIG. 11), the intersection 42 of the straight line elements of the cone 40 and the lip relief surface 14 do not result in a true circle. The cone 40, however, has true circle cross sections at any plane perpendicular to its axis 28 the same as cone 20 in FIG. 1. The same accuracy requirements also prevail. Ground in this manner with the specific relationship of the cone 40 to the web 8, the cutting edges 16 will provide the necessary metal removal function for the metal extruded by the stabilizing tip 40 to allow continuous, precise penetration. These drill point configurations are intended primarily for use in non-ferrous metals or other low-yield strength materials. For durability, the drill body in the vicinity of the point should be 62 Rockwell C or harder.

The specific drill point was evolved as a result of a need to generate precision, low-cost cylindrical holes in aircraft structure for fatigue critical applications. This precision cylindrical hole was intended as a replacement for a precision tapered hole. An interference-fit, precision, tapered fastener was used in this tapered hole. The cylindrical fastener and hole were considered to be a significant advantage to the aircraft industry in terms of cost reduction if the required fatigue performance could be provided.

In the course of the fatigue test program to develop the fastener replacement concept, it was noticed that an unacceptable fatigue result was occurring. This deterioration in anticipated results was traced to the slight corkscrewing effect of conventionally ground twist drills.

For example:
2024-T351 .630/.630 STACK

| Specimen identification | Cycles to Failure | |
|---|---|---|
| JB-26 | 88 200 | Conventionally |
| -27 | 64 570 | pointed drills |
| -28 | 46 810 | |
| -29 | 42 220 | (Corkscrewed holes) |
| -30 | 35 890 | |

| Specimen Identification | Cycles of Failure | |
|---|---|---|
| JB-26-1 | 117 820 | Guide tip drills |
| -27-1 | 148 590 | (Straight holes) |
| -28-1 | 113 330 | |
| -29-1 | 153 040 | |
| -30-1 | 135 250 | |
| | Approx. 192% Increase | |

| Specimen Identification | Cycles to Failure |
|---|---|
| JB-71 | 21 730 |
| -72 | 16 350 |
| -73 | 23 610 |
| -74 | 15 010 |
| -75 | 19 420 |
| JB-71-1 | 38 690 |
| -72-1 | 61 150 |
| -73-1 | 67 130 |
| -74-1 | 66 480 |
| -75-1 | 86 820 |
| | Approx. 234% Increase |

FATIGUE TEST RESULTS 5/16 DIA. 7.0' HD HI-TIGUE IN 82° CSK'S

Thus it becomes significantly apparent how important the precision straightness capability of the guide tip feature is on the present invention. Its precision and stabilizing feature associated with an adequate stabilizing feed rate and contiguous cutting edges to allow continuous penetration are adequate to provide a hole that is straight to precision tolerances sufficient to utilize for fatigue rated structures.

There is thus provided an improved rotary cutting implement or drill for making precision, straight holes whereby the objects of the present invention listed above and numerous additional advantages are attained.

What is claimed is:

1. A drill for drilling a straight hole through metal of a thickness greater than the hole diameter comprising a conventional elongated drill body having opposed helical flute surfaces separated by a central web and terminating in a point configuration, said point configuration comprising two primary cutting edges of conventional shape formed by the intersection of the helical flute surfaces and the surface of the point configuration, a non-cutting integral guide tip protuberance formed symmetrically with respect to the longitudinal axis of said drill body and being generally conical in shape and circular in cross-section, and secondary cutting edges formed in said central web adjacent said guide tip protuberance.

2. The combination according to claim 1 wherein the base diameter of said guide tip protuberance is less than the thickness of said central web.

3. The combination according to claim 1 wherein the point configuration includes a surface segment formed as a radiused transition between the outer surface of said drill body and the surface of said point configuration.

4. A drill for drilling a straight hole through metal of a thickness greater than the hole diameter comprising a conventional elongated drill body having opposed helical flute surfaces separated by a central web and terminating in a point configuration, said point configuration comprising two primary cutting edges of conventional shape formed by the intersection of the helical flute surfaces and the surface of the point configuration, a non-cutting integral guide tip protuberance formed symmetrically with respect to the longitudinal axis of said drill body and being generally conical in shape and circular in cross-section, the shape of said integral guide tip protuberance being such that at least one of its cross-sectional diameters intersects the helical flute surfaces at the point of minimum thickness of the central web.

* * * * *